US006193790B1

(12) United States Patent
Tani

(10) Patent No.: US 6,193,790 B1
(45) Date of Patent: Feb. 27, 2001

(54) POLISHING COMPOSITION

(75) Inventor: Katsumi Tani, Aichi (JP)

(73) Assignee: Fujimi Incorporated, Nishikasugai-gun (JP)

( * ) Notice: Subject to any disclaimer, the term of this patent is extended or adjusted under 35 U.S.C. 154(b) by 0 days.

(21) Appl. No.: 09/325,393

(22) Filed: Jun. 4, 1999

(30) Foreign Application Priority Data

Jun. 15, 1998 (JP) ................................................ 10-166756

(51) Int. Cl.[7] ................................ C09K 3/14; C09G 1/02; C09G 1/04; B24B 1/00
(52) U.S. Cl. .................................. 106/3; 51/308; 51/309; 252/79.1; 510/165; 510/397; 438/692; 438/693
(58) Field of Search .............................. 51/308, 309, 307; 106/3; 438/692, 693; 252/79.2, 79.1, 79.4, 79.5; 510/165, 167, 175, 397

(56) References Cited

U.S. PATENT DOCUMENTS

| | | | | |
|---|---|---|---|---|
| 4,956,015 | * | 9/1990 | Okajima et al. | 106/3 |
| 5,366,542 | * | 11/1994 | Yamada et al. | 106/3 |
| 5,733,819 | * | 3/1998 | Kodama et al. | 106/3 |
| 5,783,489 | * | 7/1998 | Kaufman et al. | 51/308 |
| 5,858,813 | * | 1/1999 | Scherber et al. | 252/79.2 |
| 5,954,997 | * | 9/1999 | Kaufman et al. | 252/79.1 |
| 5,993,686 | * | 11/1999 | Streinz et al. | 51/309 |
| 6,063,306 | * | 5/2000 | Kaufman et al. | 252/79.2 |

* cited by examiner

*Primary Examiner*—Michael Marcheschi
(74) *Attorney, Agent, or Firm*—Oblon, Spivak, McClelland, Maier & Neustadt, P.C.

(57) ABSTRACT

A polishing composition for memory hard disks, which comprises water and at least one abrasive selected from the group consisting of aluminum oxide, silicon dioxide, cerium oxide, zirconium oxide, titanium oxide, silicon nitride and manganese dioxide, and which further contains succinic acid or its salt dissolved in the composition.

9 Claims, No Drawings

POLISHING COMPOSITION

POLISHING COMPOSITION

The present invention relates to a polishing composition suitable for finish polishing of the surface of substrates for memory hard disks, i.e. magnetic disks to be used for memory devices used for computers, etc., in the production of such memory hard disks. More particularly, the present invention relates to a polishing composition which is useful for finish polishing of disk substrates (hereinafter referred to as "substrates") to be used for memory hard disks represented by Ni-P disks, Ni-Fe disks, aluminum disks, boron carbide disks and carbon disks and which is applicable to a production technique, whereby it is possible to prevent formation of micro protrusions, micro pits and other surface defects and to provide a polishing rate not lower than conventional polishing compositions, and at the same time, it is possible to obtain an excellent finished surface useful for magnetic disk devices with high capacities and high recording densities.

Memory hard disks to be used for magnetic disk devices as memory media for computers, etc., tend to be small in size and large in capacity year after year, and magnetic media are changing from conventional coating type media to thin film media by means of a sputtering method, a plating method or the like.

Substrates which are most widely used at present, are ones having electroless Ni-P plating applied to a blank material. Here, a blank material is one obtained by shaping an aluminum or other base plate as a base material for a substrate, by lathe processing by means of a diaturn for the purpose of providing parallelism or flatness, by lapping by means of a PVA grindstone prepared by binding SiC abrasive material, or by other methods. However, by the above-mentioned various shaping methods, it is not possible to completely remove relatively large waviness. Accordingly, when electroless Ni-P plating is applied to such a blank material, a film will be formed along such waviness, whereby the resulting substrate will also have the waviness. Polishing is carried out for the purpose of removing such waviness of the substrate and smoothing the surface.

Along with the increase in the capacity of memory hard disks, the area recording density is increasing at a rate of a few tens % per year. Accordingly, the space on a memory hard disk occupied by a predetermined amount of information recorded, tends to be very narrow, and the magnetic force required for recording tends to be weak. Accordingly, with a recent magnetic disk device, it is required to reduce the head flying height which is the space between the magnetic head and the memory hard disk, and the head flying height has now been reduced to a level of not higher than 0.02 $\mu$m.

Further, so-called texturing may be applied to provide a concentric texture to a substrate after polishing, for the purpose of preventing sticking to the memory hard disk of a magnetic head for reading and writing information, or preventing a possibility that the magnetic field on a memory hard disk becomes non-uniform due to a texture in one direction which is different from the rotational direction of the memory hard disk, formed by polishing the substrate surface. Recently, light texturing is carried out to reduce the texture provided on the substrate for the purpose of further reducing the flying height of the head, and a non-textured substrate is now being employed which has no texturing applied. A technique to support such reduction of the flying height of the magnetic head has been developed, and reduction of the flying height of the head is progressing more than ever.

A magnetic head flies along the shape of the surface of a memory hard disk which is rotated at a very high speed. If there is a micro protrusion of a level of a few $\mu$m on the memory hard disk surface, so-called "head crush" is likely to occur, and the head crushes against the protrusion, whereby the magnetic head and/or the magnetic medium on the surface of the memory hard disk may be damaged, thus leading to a failure of the magnetic disk device or an error in reading or writing information.

On the other hand, if pits are present on a memory hard disk, information can not be completely written, thus leading to omission of information or failure in reading out of information, so-called "bit falls", and causing an error.

Here, "pits" are dents initially present in the substrate or dents formed on the substrate surface by polishing, and micro pits are dents having a diameter of less than about 10 $\mu$m, among them.

Accordingly, it is important to reduce the roughness on the substrate surface, and at the same time, it is necessary to completely remove relatively large waviness, micro protrusions or pits and other surface defects, in the step before forming a magnetic medium i.e. in the polishing step.

For the above-described purpose, it has been heretofore common to carry out finishing by a single polishing operation by means of a polishing composition (hereinafter referred to as a "slurry" from its nature) comprising an aluminum oxide or other various abrasives and water, and various polishing accelerators. For example, JP-B-64-436 and JP-B-2-23589 disclose a polishing composition for memory hard disks, prepared by adding and mixing aluminum nitrate, nickel nitrate or nickel sulfate as a polishing accelerator to water and aluminum oxide, to form a slurry. Further, JP-B-4-38788 discloses an acidic polishing composition for aluminum magnetic disks, which is prepared by adding gluconic acid or lactic acid as a polishing accelerator and colloidal alumina as a surface-modifier, to water and fine powder of alumina abrasive. Still further, JP-A-7-216345 discloses a polishing composition comprising water, an alumina abrasive and a polishing accelerator, wherein the polishing accelerator comprises a molybdenate and an organic acid.

However, with any one of the above polishing compositions, it has been very difficult to satisfy all of the requirements for removing relatively large waviness and surface defects on a substrate surface, finishing to reduce the surface roughness to a very low level in a predetermined period of time and preventing formation of micro protrusions, micro pits and other surface defects, in a single step of polishing. Accordingly, a polishing process comprising at least two steps has now been studied.

To carry out a polishing process in two steps, it is the main purpose of polishing in the first step to remove the relatively large waviness, large pits and other surface defects on the substrate surface, i.e. to carry out fairing or reshaping. Accordingly, a polishing composition is required which has a high ability to process and mend the above-mentioned waviness or surface defects with little formation of deep scratches which can not be removed by finish polishing in the second step, rather than to reduce the surface roughness.

The purpose of polishing in the second step i.e. finish polishing is to minimize the surface roughness of the substrate. For this purpose, it is important for a polishing composition to be able to reduce the surface roughness and to prevent formation of micro protrusions, micro pits and other surface defects, rather than to have a high ability to process or mend a large waviness or surface defects as required for polishing in the first step. Further, from the viewpoint of the productivity, it is also important that the polishing rate is high. As far as the present inventors are aware, it is possible to obtain a substrate surface having small surface roughness in polishing in the second step by a conventional two step polishing, but the polishing rate is very low and inadequate for practical production, or it has been difficult to prevent formation of micro protrusions, micro pits or other surface defects.

The degree of surface roughness is determined by the process for preparing the substrate, the final memory capacity as the memory hard disk, and other conditions, and depending upon the degree of the desired surface roughness, a polishing process comprising more than two steps may be employed.

It is an object of the present invention to solve the above-described problems and to provide a polishing composition which is capable of preventing formation of micro protrusions, micro pits and other surface defects with a polishing rate not lower than conventional polishing compositions, in finish polishing of a substrate to be used for a memory hard disk, and which, at the same time, is capable of obtaining an excellent finished surface which is useful for a magnetic disk device with a high capacity and a high memory density.

The present invention provides a polishing composition for memory hard disks, which comprises water and at least one abrasive selected from the group consisting of aluminum oxide, silicon dioxide, cerium oxide, zirconium oxide, titanium oxide, silicon nitride and manganese dioxide, and which further contains succinic acid or its salt dissolved in the composition.

The polishing composition of the present invention is capable of preventing formation of micro protrusions, micro pits and other surface defects with a polishing rate not lower than conventional polishing compositions, in finish polishing of a substrate to be used for a memory hard disk and, at the same time, capable of obtaining an excellent finished surface.

Now, the present invention will be described in detail with reference to the preferred embodiments.

ABRASIVE

The abrasive suitable for use as the main abrasive among various components of the polishing composition of the present invention, is selected from the group consisting of aluminum oxide, silicon dioxide, cerium oxide, zirconium oxide, titanium oxide, silicon nitride and manganese dioxide. Aluminum oxide includes α-alumina, δ-alumina, θ-alumina, κ-alumina and other morphologically different substances. Further, there is one called fumed alumina from the method of its preparation.

Silicon dioxide includes colloidal silica, fumed silica and many other different types which differ in the nature or the method of preparation.

Cerium oxide includes trivalent one and tetravalent one from the oxidation number, and it includes hexagonal system, regular system and face-centered cubic system, from the crystal system.

Zirconium oxide includes monoclinic system, tetragonal system and amorphous one from the crystal system. Further, there is one called fumed zirconia from the method of its preparation.

Titanium oxide includes titanium monoxide, dititanium trioxide, titanium dioxide and others, from the crystal system. Further, there is one called fumed titania from the method of its preparation.

Silicon nitride includes α-silicon nitride, β-silicon nitride, amorphous silicon nitride and other morphologically different substances.

Manganese dioxide includes α-manganese dioxide, β-manganese dioxide, γ-manganese dioxide, δ-manganese dioxide, ε-manganese dioxide, η-manganese dioxide and others from the morphology.

For the composition of the present invention, these abrasives may be used optionally or in an optional combination, as the case requires. When they are used in combination, the particular combination or the ratio is not particularly limited.

The above abrasives are ones which polish the surface to be polished by a mechanical action as abrasive grains. The particle size of silicon dioxide among them is usually from 0.005 to 0.5 μm, preferably from 0.01 to 0.2 μm, as an average particle size obtained from the surface area measured by a BET method. Likewise, the particle size of aluminum oxide, zirconium oxide, titanium oxide, silicon nitride or manganese dioxide, is usually from 0.005 to 0.5 μm. preferably from 0.05 to 0.5 μm, as an average particle size obtained from the surface area measured by a BET method. Further, the particle size of cerium oxide is usually from 0.01 to 0.5 μm. preferably from 0.05 to 0.45 μm, as an average particle size observed by a scanning electron microscope.

If the average particle sizes of these abrasives exceed the respective ranges as shown above, there will be a problem such that the surface roughness of the polished surface will be large, or scratches are likely to form. On the other hand, if they are smaller than the respective ranges, the polishing rate tends to be very low, such being not practical.

The content of the abrasive in the polishing composition is usually from 0.1 to 50 wt %, preferably from 1 to 25 wt %, based on the total amount of the composition. If the content of the abrasive is too small, micro protrusions or micro pits, and other surface defects, tend to form, and the polishing rate is likely to be low. On the other hand, if it is too large, uniform dispersion tends to hardly be maintained, and the viscosity of the composition tends to be excessive, whereby handling is likely to be difficult.

SUCCINIC ACID OR ITS SALT

The polishing composition of the present invention further contains succinic acid or its salt. In the polishing composition of the present invention, succinic acid accelerates the polishing action by a chemical action, as a polishing accelerator. Succinic acid or its salt to be used may be any optional one so long as it can be dissolved in the composition. Specifically, it may, for example, be succinic acid, sodium succinate, potassium succinate or ammonium succinate.

The content of succinic acid or its salt in the polishing composition of the present invention varies depending upon the type of succinic acid or its salt, but it is preferably from 0.01 to 10 wt %, more preferably from 0.05 to 5 wt %, most preferably from 0.1 to 3 wt %, based on the total amount of the polishing composition. As the amount of succinic acid or its salt increases, the polishing rate tends to increase, and formation of micro pits tends to decrease. However, even if the amount is increased excessively, no stronger effect of the present invention is likely to be obtainable, and an economical demerit is likely to result. On the other hand, if the amount is too small, it will be difficult to adequately prevent formation of micro protrusions, micro pits and other surface defects, and no adequate polishing rate tends to be obtainable.

ALUMINA SOL

The polishing composition of the present invention may further contain alumina sol. Alumina sol for the purpose of the present invention is one having hydrated alumina or aluminum hydroxide dispersed in an acidic aqueous solution in a colloidal state. Hydrated alumina includes boehmite, pseudo boehmite, diaspore, gypsite, bialite and others. The alumina sol to be used for the composition of the present invention is particularly preferably one having boehmite or pseudo boehmite dispersed in an acidic aqueous solution.

The content of the alumina sol in the polishing composition of the present invention is preferably from 0.01 to 20 wt %, more preferably from 0.05 to 15 wt %, most preferably from 0.1 to 10 wt %, based on the total amount of the composition. As the amount of the alumina sol is increased, formation of micro pits and other surface defects tends to decrease. However, even if the amount is increased excessively, no further effect of the present invention may be obtained, and an economical demerit is likely to result.

POLISHING COMPOSITION

The polishing composition of the present invention is prepared usually by mixing and dispersing an abrasive selected from the group consisting of aluminum oxide, silicon dioxide, cerium oxide, zirconium oxide, titanium oxide, silicon nitride and manganese dioxide in water in an optional content, and further dissolving succinic acid or its salt. If necessary, alumina sol may further be mixed and dispersed to this slurry. The method of dispersing or dissolving these components in water, is optional. For example, they may be dispersed by ultrasonic dispersion or stirring by a vane type stirrer. Further, order of mixing them is optional, and dispersion of the abrasive, dissolution of succinic acid or its salt, and mixing and dispersing alumina sol when used, may be carried out in any order, or simultaneously.

Further, various known additives may further be incorporated for the purpose of stabilizing or maintaining the quality of the product, or as required depending upon the type of the object to be polished, the condition for polishing and other requirements for polishing.

The following may be mentioned as suitable examples of such further additives:

(a) celluloses, such as cellulose, carboxymethyl cellulose, hydroxyethyl cellulose and others, (b) water-soluble alcohols such as ethanol, propanol, ethylene glycol and others, (c) surfactants such as a sodium alkylbenzenesulfonate, a formalin condensate of naphthalene sulfonic acid, and others, (d) organic polyanionic substances, such as sodium lignin sulfonate, polyacrylate and others, (e) water-soluble polymers (emulsifiers), such as polyvinyl alcohol and others, (f) chelating agents such as dimethyl glyoxime, dithizone, oxine, acetylacetone, glycine, EDTA, NTA and others, and (g) fungicides, such as sodium alginate, potassium hydrogencarbonate and others Further, the above abrasive, succinic acid or its salt, and optional alumina sol, suitable for use in the polishing composition of the present invention, may be employed as auxiliary additives for the purpose other than the above-mentioned purpose, e.g. for preventing sedimentation of the abrasive.

Further, the polishing composition of the present invention may be prepared and stored or transported in the form of a stock solution having a relatively high concentration, so that it may be diluted for use at the time of actual polishing operation. The above-mentioned preferred concentration ranges are those for the practical polishing operation. It is needless to say that in a case where the composition is diluted at the time of actual use, it is in the form of a solution having a high concentration when it is stored or transported. Further, from the viewpoint of the handling efficiency, it is preferably prepared in such a concentrated form.

JP-B-4-38788 describes that even if succinic acid is added to a polishing composition comprising water, aluminum oxide having an average particle size of from 0.5 to 15 $\mu$m and alumina sol, it is not possible to prevent formation of micro protrusions, micro pits and other surface defects in the polishing operation. In view of this description, it is surprising that the polishing composition of the present invention is capable of preventing formation of such surface defects. The detailed mechanism has not yet been known, but the following explanation may be made taking a Ni-P plated substrate as an example Firstly, with respect to the reason why formation of micro protrusions, micro pits and other surface defects can be prevented, succinic acid or its salt has an action to accelerate the mechanical polishing effect of the abrasive, and effectively acts against relatively small particles, although the action may not be adequate against large abrasive particles This action tends to be enhanced by an addition of alumina sol. This is considered attributable to the fact that the alumina sol adheres to the surface of the abrasive in the composition or is dispersed among the abrasive particles in the composition in a colloidal state and thus has a function to create an excellent dispersed state of the abrasive, and it acts especially effectively against relatively small abrasive particles.

On the other hand, with respect to a reason why an excellent polished surface having a small surface roughness, can be obtained, it is considered that by the use of an abrasive having a relatively small average particle size and by the effect of succinic acid or its salt as described above, micro protrusions, micro pits and other surface defects can hardly be formed, and a smooth surface to be coated which is free from scratch marks, can be obtained.

Further, in a case where the polishing composition of the present invention contains alumina sol, the alumina sol deposits on the surface of abrasive particles in the composition and thereby accelerates the mechanical polishing action of the abrasive, whereby micro protrusions, micro pits and other surface defects on the surface to be polished, can be prevented. Further, it is dispersed in a colloidal state among the abrasive particles in the composition thereby to provide a function to prevent the abrasive from settling down firmly, and it also has a function to adjust the viscosity of the composition or to let the abrasive particles be readily maintained on a pad.

Now, the polishing composition of the present invention will be described in further detail with reference to Examples. However, it should be understood that the present invention is by no means restricted to such specific Examples.

PREPARATION OF POLISHING COMPOSITIONS

Firstly, as an abrasive, aluminum oxide as identified in Table 1 was dispersed in water by means of a stirrer to obtain a slurry having an abrasive concentration of 10 wt %. On the other hand, to an aqueous solution containing 1 wt % of succinic acid, 10 wt % of boehmite alumina hydrate was added and dispersed in a colloidal state by means of a homogenizer to obtain an alumina sol.

The slurry and water were mixed, and, as the case requires, the alumna sol or other additives were added, to prepare samples of Examples 1 to 4 and Comparative Examples 1 to 3.

PREPARATION OF SUBSTRATES FOR POLISHING TESTS

To carry out polishing tests using the above-mentioned polishing compositions, substrates were prepared. To carry out evaluation by two step polishing, firstly, test substrates were prepared as follows.

POLISHING CONDITIONS (FIRST STEP)

Object to be polished: 3.5 inch electroless Ni-P plated substrate

Number of sheets polished: 10 sheets

Polishing machine: Both side polishing machine (surface table diameter: 640 mm)

Polishing pad: Politex DG (manufactured by Rodel Inc., U.S.A.)

Polishing pressure: 80 g/cm$^2$

Rotational speed of surface table: 60 rpm

Polishing composition: DISKLITE-3471 (manufactured by FUJIMI INCORPORATED)

Dilution of the composition: 1:2 pure water

Amount of the polishing composition supplied: 100 cc/min

Polishing time: 5 minutes

POLISHING TEST

Then, using the substrate polished in the first step with the above polishing composition, a polishing test was carried out under the following conditions:

POLISHING CONDITIONS (SECOND STEP)

Object to be polished: 3.5 inch electroless Ni-P plated substrate (polished in the first step)

Number of sheets polished: 15 sheets

Polishing machine: Both side polishing machine (surface table diameter: 700 mm)

Polishing pad: Politex DG (manufactured by Rodel Inc., U.S.A.)

Polishing pressure: 60 g/cm$^2$

Rotational speed of surface table: 60 rpm

Amount of the polishing composition supplied: 150 cc/min

Polishing time: 5 minutes

After the polishing, the substrate was sequentially washed and dried, whereupon the weight reduction of the substrate by polishing was measured, and from the average of such weight reduction, the polishing rate was obtained. Further, by means of a differential interference microscope (400 magnifications), the substrate surface was observed, and presence or absence of formation of micro pits was measured. The evaluation standards were as follows.

⊚: Micro pits were not visually observed.

○: Micro pits were not substantially visually observed.

X: Micro pits were substantially visually observed and were a problematic level.

The obtained results were as shown in Table 1.

TABLE 1

| Example No. | Average particle size ($\mu$m) | Additive | Amount (wt %) | Alumina sol (wt %) | Polishing rate ($\mu$m/min) | Micro pits |
|---|---|---|---|---|---|---|
| 1 | 0.25 | Succinic acid | 1 | 3 | 0.20 | ○ |
| 2 | 0.25 | Succinic acid | 3 | — | 0.23 | ○ |
| 3 | 0.25 | Succinic acid | 3 | 3 | 0.23 | ⊚ |
| 4 | 0.25 | Succinic acid | 10 | 3 | 0.24 | ⊚ |
| Comparative 1 | 0.70 | Succinic acid | 3 | 3 | 0.35 | X |
| Comparative 2 | 0.25 | Gluconic acid | 3 | 3 | 0.24 | X |
| Comparative 3 | 0.25 | Lactic acid | 3 | 3 | 0.22 | X |

From the results shown in Table 1, it is evident that when the polishing compositions of the present invention are used for surface polishing of substrates, excellent polished surfaces are obtainable with little formation of micro pits and with a polishing rate not lower than conventional polishing compositions.

As described in the foregoing, the polishing composition of the present invention is capable of preventing formation of micro pits and other surface defects with a polishing rate not lower than conventional polishing compositions, in finish polishing of substrates to be used-for memory hard disks, and capable of forming excellent polished surfaces.

What is claimed is:

1. A polishing composition for memory hard disks, which comprises water and at least one abrasive selected from the group consisting of aluminum oxide, silicon dioxide, cerium oxide, zirconium oxide, titanium oxide, silicon nitride and manganese dioxide, and which further contains succinic acid or its salt dissolved in the composition, and aluminum hydroxide.

2. The polishing composition according to claim 1, wherein the abrasive is at least one abrasive selected from the group consisting of aluminum oxide, silicon dioxide, zirconium oxide, titanium oxide, silicon nitride and manganese dioxide, and the average particle size of the abrasive obtained from the surface area measured by a BET method, is from 0.005 to 0.5 $\mu$m.

3. The polishing composition according to claim 1, wherein the abrasive is cerium oxide, and the average particle size of the abrasive observed by a scanning electron microscope, is from 0.01 to 0.5 $\mu$m.

4. The polishing composition according to claim 1, wherein the content of the abrasive is from 0.1 to 50 wt %, based on the weight of the polishing composition.

5. The polishing composition according to claim 1, wherein the content of succinic acid or its salt is from 0.01 to 10 wt %, based on the weight of the polishing composition.

6. The polishing composition according to claim 1, wherein the content of aluminum hydroxide is from 0.01 to 20 wt %, based on the weight of the polishing composition.

7. A method for polishing a memory hard disk comprising polishing a memory hard disk selected from the group consisting of Ni-P disks, Ni-Fe disks, boron carbide disks and carbon disks, with a polishing composition which comprises water and at least one abrasive selected from the group consisting of aluminum oxide, silicon dioxide, cerium oxide, zirconium oxide, titanium oxide, silicon nitride and manganese dioxide, and which further contains succinic acid or its salt dissolved in the composition, and wherein the abrasive has a maximum average particle size measured by either a BET method or a scanning electron microscope of 0.5 µm.

8. The method according to claim 7, wherein the memory hard disk is a Ni-P disk.

9. The method according to claim 7, wherein the average particle size is not greater than 0.25 µm.

* * * * *